June 7, 1966 H. GÖSSEL ET AL 3,254,950
PROCESS FOR THE MANUFACTURE OF HYDROGEN CYANIDE
AND ACETIC ACID FROM OXIMINOACETONE
Filed May 29, 1962
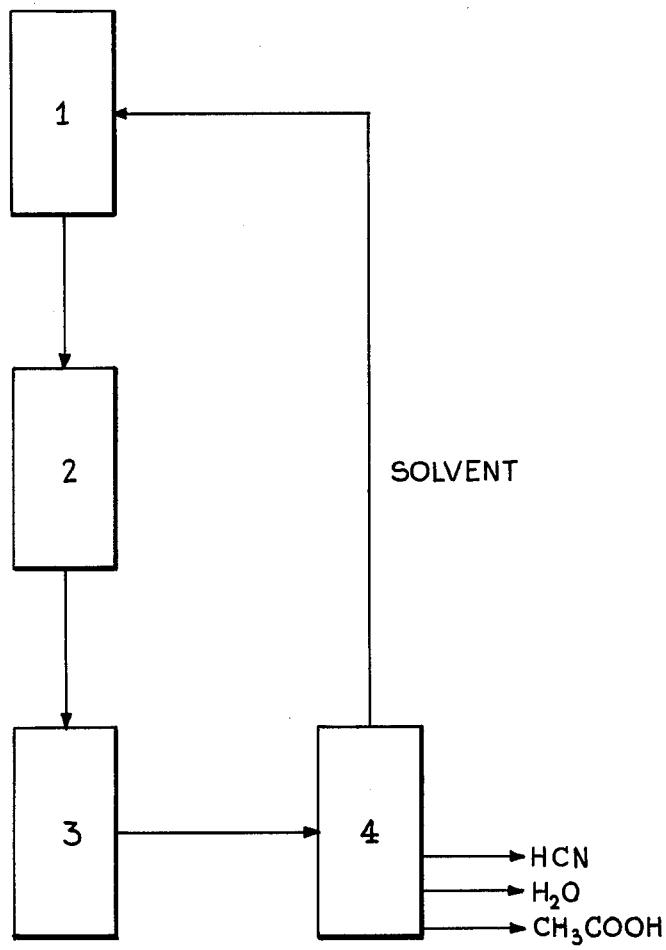
INVENTORS
*HELMUT GÖSSEL*
*GÜNTHER JAKOBSEN*
*HEINZ SPÄTHE*
BY *Curtis, Morris & Safford*
ATTORNEYS United States Patent Office 3,254,950
Patented June 7, 1966

3,254,950
PROCESS FOR THE MANUFACTURE OF HYDROGEN CYANIDE AND ACETIC ACID FROM OXIMINOACETONE
Helmut Gössel, Günter Jacobsen, and Heinz Späthe, Frankfurt am Main, Germany, assignors to Farbwerke Hoechst Aktiengesellschaft vormals Meister Lucius & Brüning, Frankfurt am Main, Germany, a corporation of Germany
Filed May 29, 1962, Ser. No. 198,502
Claims priority, application Germany, June 3, 1961, F 34,080
17 Claims. (Cl. 23—151)

The present invention relates to a process for the manufacture of hydrogen cyanide and acetic acid from oximinoacetone.

In industry, hydrogen cyanide is prepared either by reacting hydrocarbons, for example methane, with ammonia on platinum catalysts at a temperature in the range of 900 to 1200° C., or from carbon monoxide and ammonia at high temperatures or from formamide by dehydration at 370° C.

Acetic acid is produced on an industrial scale by catalytic oxidation of alcohol, acetaldehyde or low molecular weight hydrocarbons, in the latter case acetic acid being obtained in admixture with higher fatty acids.

It has now been found that hydrogen cyanide and acetic acid can be produced simultaneously by thermally decomposing oximinoacetone in the solid or liquid phase, i.e. in non gaseous state at a temperature in the range of 20 to 300° C.

For promoting the thermal decomposition it is of advantage to operate at moderately elevated temperatures. Oximinoacetone decomposes with a sufficient speed and in the absence of catalysts at a temperature above 100° C. and preferably above 150° C. to yield hydrogen cyanide and acetic acid. An advantage of the present process resides in the fact that hydrogen cyanide and acetic acid can be produced simultaneously under mild temperature conditions and in economic manner. A further advantage is that propylene can be transformed in a controlled reaction via acetone and oximinoacetone into the industrially important compounds hydrogen cyanide and acetic acid. The decomposition is suitably accelerated by appropriate catalysts. In some cases, the catalysts allow a considerable reduction of the temperatures required for the decomposition.

As catalysts in the decomposition of oximinoacetone to yield hydrogen cyanide and acetic acid there may be used compounds having a neutral or acid reaction, especially compounds having a dehydrating action.

Suitable catalysts are the neutral or acid oxides or mixed oxides of the elements of sub-group A of I to IV of the Periodic Table, for example beryllium oxide, aluminum oxide, and aluminum-magnesium oxide; alkali metal and alkaline earth metal hydrogen-sulfates such as sodium hydrogen-sulfate and calcium hydrogen-sulfate; the oxides of sub-groups B of groups IV to VI of the Periodic Table, for example thorium oxide, vanadium pentoxide, tungsten oxide, chromium oxide; phosphates, silicates and mixed silicates of the elements of main groups I to III of the Periodic Table, for example of calcium, magnesium and aluminum; catalysts on the basis of kaolinite, montmorillonite and zeolite; molecular sieves and ion exchange resins splitting off water, especialy silica gel. The oxides of the transition metals are very well suitable, especially vanadium pentoxide and zinc oxide, if they are supported on carrier materials, for example those mentioned above, particularly on silica gel or pumice.

Basic catalysts that can be used in the process of the invention are inorganic compounds such as sodium carbonate, and especially organic derivatives of the elements of main group V of the Periodic Table, for example the hydrocarbon substitution products of ammonia $NH_3$, hydrogen phosphide $PH_3$ arsenic hydride $AsH_3$, antimony hydride $SbH_3$ and bismuth hydride $BiH_3$. According to their nature, the amines and phosphines are preferred, especially those which carry three hydrocarbon radicals at least one of which is an aryl radical, such as triphenylamine, dimethylaniline, diethylaniline or tribenzylamine. In some cases disubstituted compounds can also be used, for example dibenzylamine. The aryl radicals of the aforesaid compounds may also be substituted by low molecular alkyl groups and by other reaction inert substituents, for example chlorine atoms, nitro groups or amino groups, so that compounds such as tri-p-tolylamine, triphenylamines carrying chlorine atoms at the nucleus and similar compounds can be used. Still further, there can be used cyclic tertiary amines, such as quinoline, pyridine and their alkylsubstitution products of low molecular weight. From among the derivatives of hydrogen phosphide $PH_3$ there are especially suitable those compounds in which the phosphorus atom is bound to three aryl radicals, preferably phenyl radicals, for example, tri-p-tolylphosphine, p-ethylphenyl-diphenyl-phosphine and particularly triphenyl-phosphine.

The catalysts are preferably used in an amount of 0.5 to 10 and more advantageously 2 to 4%, calculated on the weight of oximinoacetone to be decomposed.

The oximinoacetone can be used in solid form, if desired in admixture with one of the catalysts defined above. It is of advantage, however, to operate in the liquid phase by dissolving or suspending the oximinoacetone in an inert inorganic or preferably organic solvent.

Suitable solvents or suspension agents (fluid diluting agents) are, for example, aromatic hydrocarbons such as benzene, toluene, xylenes, naphthalene, α-methylnaphthalene, diphenyl; aliphatic or cycloaliphatic hydrocarbons such as hexane, heptane, paraffin mixtures or other hydrocarbons preferably boiling within the range of 50 and 200° C.; ethers such as diisopropyl ether, di-n-butyl ether, di-n-isoamyl ether, anisole, dioxane, diphenyl oxide, diethylene glycol di-n-butyl ether and other glycol ethers; ketones such as acetone, methylethylketone, acetophenone and benzophenone; chlorohydrocarbons such as chlorobenzene; nitrohydrocarbons such as nitrobenzene; carboxlyic acids, particularly aliphatic carboxylic acids having 1 to 20 carbon atoms such as formic acid, acetic acid, propionic acid, butyric acid, valeric acid, ethylhexanoic acid and stearic acid; esters such as ethyl acetate, butyl acetate, benzyl benzoate and phthalic acid diethyl esters. It is especially advantageous to use acetic acid since it is formed in the reaction. The presence of not too high an amount of water does not disturb the reaction. Thus, there can be used as solvent also aqueous inorganic acids, for example aqueous phosphoric acid. In certain cases the presence of water has a favorable effect on the reaction.

Solvent and reaction temperature must be adapted to one another in so far as the solvent must be liquid at the reaction temperature applied.

The temperatures to be applied depend not only on the solvent but also in the first place on the nature of the catalyst used. When operating in the presence of neutral or acid catalysts it is of advantage to use a temperature in the range of 100 to 300° C., preferably 150 to 220° C. When basic catalysts are used, lower reaction temperatures in the range of 20 to 250° C. are sufficient. Basic catalysts, especially triphenylphosphine often give better yields than neutral or acid catalysts under otherwise identical conditions.

In a solution of oximinoacetone in aqueous formic acid the decomposition sets in after the addition of catalytic amounts of triphenylphosphine already at room temperature with spontaneous heating, hydrogen cyanide and acetic acid being obtained in good yields. When amines are used as catalysts, it is necessary to apply higher temperatures, preferably in the range of 40 to 170° C. With triphenylphosphine as catalyst the reaction is preferably carried out at a temperature in the range of 20 to 130° C.

According to a further embodiment of the process of the invention the reaction is carried out in the presence of dehydrating substances such as carboxylic anhydrides, particularly acetic anhydride, in a stoichiometric amount, calculated on the oximinoacetone. In this case the decomposition is suitably effected in the presence of at least one mol of water per mol of oximinoacetone.

A preferred variant of the process of the invention consists in dissolving the oximinoacetone in one of the solvents defined above, adding the catalyst and heating the mixture to the reaction temperature. The hydrogen cyanide set free is condensed by intense cooling and can be used directly for industrial purposes. In case the reaction temperature applied is near the boiling point of the inert solvent used or of acetic acid formed, the hydrogen cyanide and acetic acid must be separated in a further distilling stage from one another and from the solvent. If catalysts are used which are less volatile than the reaction products formed and the solvent used the catalyst may be recovered from the distillation residue and used again in the reaction.

It is suitable to dissolve first the catalyst in an inert solvent at the reaction temperature required and then to add the oximinoacetone either in substance or dissolved in an inert solvent. When operating in this manner the exothermal decomposition reaction can be controlled in an especially easy manner.

During the reaction the hydrogen cyanide, the solvent and the acetic acid are continuously removed from the reaction space by distillation. The liquid must be regenerated from time to time, for example by distillation or absorption in order to remove small quantities of dark by-products formed in the reaction. If appropriate flow tubes are used, the reaction can also be carried out in continuous manner.

The reaction tube can be heated, for example, by a heating liquid or by electric means. The gases leaving the reaction tube are condensed in a condenser and collected in a receiver. The mixture thus obtained is composed of solvent, hydrogen cyanide, acetic acid and water. It can be separated, for example, by fractional distillation and the solvent can be re-used for dissolving fresh amounts of oximinoacetone.

Still further, it is possible directly to decompose as described above a solution of oximinoacetone in acetone obtained in the manufacture of oximinoacetone from acetone and nitrous gases. After the neutralization of the acid catalyst used in this process the acetone is separated by distillation while the inert solvent used for decomposition is added simultaneously. Thus, the difficulties are avoided which arise in the later distillative separation of acetone and hydrogen cyanide, on the one hand, and the isolation of oximinoacetone in substance, on the other. After the addition of a basic catalyst the oximinoacetone contained in the solution is then decomposed in the manner described above to yield hydrogen cyanide and acetic acid.

The decomposition is advantageously carried out under atmospheric pressure, but superatmospheric pressure or subatmospheric pressure may likewise be applied. A pressure increase, however, involves a reduction of the yield, whereas a reduction of the pressure is favorable to the course of the reaction.

The accompanying drawing illustrates diagrammatically by way of example an apparatus for carrying out the present process. In receiver 1 the oximinoacetone is dissolved in a solvent and introduced continuously into heated reactor 2 which is charged with the catalyst (and may be supplied with the heating liquid, i.e. one of the solvents mentioned above). In the reactor the oximinoacetone is decomposed into hydrogen cyanide and acetic acid. The reaction product travels via a condenser or a distillation bridge 3 into fractionating column 4 in which the mixture is separated into the components solvent, hydrogen cyanide, acetic acid and water. The solvent is used again for dissolving fresh amounts of oximinoacetone in receiver 1.

The following examples serve to illustrate the invention but they are not intended to limit it thereto, the parts being parts by weight and the percentages being percent by weight.

Example 1

(a) 200 grams of an about 25% solution of oximinoacetone in acetone were passed continuously per hour through a vertical reaction tube having a diameter of 25 mm. and a length of 350 mm. The reaction tube consisted of stainless steel, was provided with a heating jacket and filled with granular silica gel. The liquid circulating through the heating jacket had a temperature of 150° C. The lower end of the reaction tube was connected, via a condenser, with a receiver in which the solvent, and the decomposition products of the oximinoacetone were collected. When operating in this manner 65% of the oximinoacetone were decomposed to yield hydrogen cyanide and acetic acid. The mixture was separated by distillation.

(b) When the silica gel in the reaction tube was replaced by filling bodies of steel only 10% of the oximinoacetone were decomposed to hydrogen cyanide. A packing with molecular sieves (artificial zeolites) yielded a 40% decomposition of the oximinoacetone into hydrogen cyanide and acetic acid.

When the process was carried out as described sub (a) and the receiver at the foot of the apparatus was especially well cooled and connected with a vacuum pump so that a pressure of 350 mm. mercury was maintained, a yield of hydrogen cyanide and acetic acid of 65% of the theory, calculated on the oximinoacetone used, was obtained on working up the condensate.

(c) The process was carried out as described sub (a) with the exception that the circulating liquid had a temperature of 185° C. The yield of hydrogen cyanide and acetic acid amounted to 60% of the theory, calculated on the oximinoacetone used.

Example 2

In a 500 cc. four-necked flask provided with an airtight stirrer, a distillation bridge, a thermometer and a dropping funnel, 100 grams of acetic anhydride were heated to 120° C. 10 grams of pure recrystallized oximinoacetone dissolved in 60 grams of water-containing acetone were dropped in. The acetone evaporated at once and distilled over together with the hydrogen cyanide and the acetic acid. The acetic anhydride gradually turned dark. The cooled receiver contained 79% of the theory of hydrogen cyanide.

Example 3

50 grams of a 25% solution of oximinoacetone in acetone were rapidly dropped into 200 grams of nitrobenzene heated at 200° C. The yield of hydrogen cyanide and acetic acid amounted to 66% of the theory.

*Example 4*

A solution of 10 grams of pure recrystallized oximinoacetone in acetone was dropped into a suspension, heated at 180° C., of silica gel in nitrobenzene. The yield of hydrogen cyanide and acetic acid amounted at 68% of the theory.

*Example 5*

A 15% solution of oximinoacetone in acetone was continuously dropped, while vigorously stirring, in an amount of 50 grams per hour into a four-necked flask containing a mixture of 80 grams of diethylene glycol di-n-butyl ether and 35 grams of granular silica gel heated at 220° C. The yield of hydrogen cyanide and acetic acid amounted to 80% of the theory.

*Example 6*

(a) In a flask provided with gas inlet tube and reflux condenser, 0.3 part of triphenylphosphine was added to 50 parts of a mixture of 25% of pure oximinoacetone, 71% of acetic acid and 4% of water. The decomposition of the oximinoacetone which set in spontaneously in most cases was completed by heating the mixture for one hour at 120 C. The hydrogen cyanide formed was suitably withdrawn by means of a nitrogen current passed through the reaction mixture and condensed by intense cooling. 9.7 parts of hydrogen cyanide were obtained which corresponded to a yield of 95%. In the reaction vessel the amount of acetic acid was increased by 8.2 parts. On distilling off the acetic acid there remained behind a residue of about 1 part containing the triphenylphosphine. The residue could be used without further purification as catalyst for the decomposition of oximinoacetone, the same good yield being obtained.

(b) When operating as described sub (a) with the exception that water was excluded, hydrogen cyanide and acetic acid were obtained in a yield of 90%, calculated on the oximinoacetone used.

(c) Under the conditions of Example 6(a), but with a water content of 11%, 87% of the oximinoacetone were decomposed into hydrogen cyanide and acetic acid.

*Example 7*

50 parts of a mixture of 25% of oximinoacetone, 64% of formic acid and 11% of water were decomposed as described in Example 6 in the presence of 1 part of triphenylphosphine. The yield of hydrogen cyanide and acetic acid amounted to 85%.

*Example 8*

50 parts of a mixture of 25% of oximinoacetone and 75% of propionic acid were reacted in the presence of 1 part of triphenylphosphine, whereby hydrogen cyanide and acetic acid were obtained in a yield of 95%.

*Example 9*

50 parts of a mixture of 25% of oximinoacetone and 75% of di-n-butylether were reacted in the presence of 1 part of triphenylphosphine as described in Example 6. 56% of the oximinoacetone were decomposed into hydrogen cyanide and acetic acid.

*Example 10*

In an apparatus as described in Example 6, 50 parts of a mixture of 25% of oximinoacetone and 75% of diethylene glycol d-n-butylether were heated for 2 hours at 120° C. with 1 part of triphenylphosphine as catalyst, while passing through nitrogen. 2.1 parts of hydrogen cyanide were obtained corresponding to a yield of 54%. When operating in analogous manner at 160° C., 2.2 parts of hydrogen cyanide were obtained, corresponding to a yield of 57%. Simultaneously the amount of acetic acid corresponding to the amount of hydrogen cyanide was obtained.

*Example 11*

The process was carried out as described in Example 10 with the exception that the triphenylphosphine was replaced by the same amount of amines. The results are indicated in the following table.

| | Oximinoacetone, parts | Catalyst, 1 part | Temperature, °C. | HCN, parts | Yield percent |
|---|---|---|---|---|---|
| (a) | 12.5 | Tribenzylamine | 120 | 0.5 | 12 |
| (b) | 12.5 | Tribenzylamine | 160 | 2.1 | 54 |
| (c) | 12.5 | Dibenzylamine | 160 | 1.8 | 46 |
| (d) | 12.5 | Quinoline | 160 | 0.95 | 24 |

*Example 12*

A four-necked flask having a capacity of 2 liters and being provided with a stirrer, a thermometer, a dropping funnel and a distillation bridge, was charged with 250 grams of phthalic acid diethyl ester and 60 parts of granular silica gel containing about 15% of vanadium pentoxide as catalyst (the catalyst had been prepared by impregnating 80 grams of granular silica gel with a hot aqueous suspension of 15 grams of ammonium tetravanadate and heating the impregnated granules at 500° C. in a current of air). The mixture was heated at 180° C., while stirring, and a solution of 220 grams of oximinoacetone of 86% strength in 440 grams of phthalic acid diethyl ester was dropped in within the course of 4 hours. The distillate obtained had a weight of 161 grams and consisted of 47.5 grams of hydrogen cyanide, 87.8 grams of acetic acid, 20.7 grams of water and 5.0 grams of phthalic acid diethyl ester. Thus the yield of hydrogen cyanide was 81% and the yield of acetic acid 67% of the theory.

When the decomposition was carried out under identical conditions with 220 grams of oximinoacetone of 84% strength and without the use of a catalyst, 126 grams of distillate were obtained consisting of 32.7 grams of hydrogen cyanide, 70.9 grams of acetic acid, 17.4 grams of water and 5.0 grams of phthalic acid diethyl ester. The yield of hydrogen cyanide thus amounted to 57% and of acetic acid to 55% of the theory.

We claim:

1. A process for the manufacture of hydrogen cyanide and acetic acid from oximinoacetone, which comprises thermally decomposing oximinoacetone in a nongaseous state at a temperature in the range of 20 to 300° C.

2. A process as claimed in claim 1, which comprises carrying out the decomposition at a temperature in the range of 150 to 300° C.

3. A process as claimed in claim 1, which comprises decomposing solid oximinoacetone.

4. A process as claimed in claim 1, which comprises decomposing oximinoacetone in a reaction inert fluid diluting agent.

5. A process as claimed in claim 1, which comprises decomposing the oximinoacetone in the presence of a catalyst.

6. A process as claimed in claim 1, which comprises using the catalyst in an amount of 0.5 to 10%, calculated on the weight of oximinoacetone to be decomposed.

7. A process as claimed in claim 5, which comprises decomposing oximinoacetone in the presence of a non basic catalyst selected from the group consisting of the oxides and mixed oxides of the metallic elements in sub-group A of Groups I to IV, the hydrogen sulfates of the elements in Groups I and II, the oxides of elements in sub-group B of Groups IV to VI, the phosphates, silicates and mixed silicates of the elements in Groups I to III, said groups being groups of the Periodic Table, mineral catalysts containing at least one of those oxides and ion exchange resins splitting off water at a temperature in the range of 100 to 300° C.

8. A process as claimed in claim 5, which comprises decomposing oximinoacetone in the presence of a basic catalyst selected from the group consisting of the hydrides of the elements in Group V of the Periodic Table and hydrocarbon substitution products thereof in a reaction inert fluid diluting agent at a temperature in the range of 20 to 250° C.

9. A process as claimed in claim 8, which comprises using acetic acid as fluid diluting agent.

10. A process as claimed in claim 8, which comprises using triphenylphosphine as catalyst and operating at a temperature in the range of 20 to 130° C.

11. A process as claimed in claim 1, which comprises carrying out the decomposition of oximinoacetone in the presence of a dehydrating agent.

12. A process as claimed in claim 11, which comprises using the dehydrating agent in at least the stoichiometric amount, calculated on the oximinoacetone used, and operating in the presence of at least the stoichiometric amount of water calculated on the oximinoacetone used.

13. A process as claimed in claim 11, which comprises using acetic anhydride as dehydrating agent.

14. A process for the manufacture of hydrogen cyanide and acetic acid from oximinoacetone which comprises decomposing oximinoacetone at a temperature in the range of about 20° to 300° C. in the presence of about 0.5% to 10%, calculated on the weight of the oximinoacetone, of a non-basic catalyst selected from the group consisting of oxides of elements in Groups I to IV, mixed oxides of elements in Groups I to IV, alkali metal hydrogen-sulfates, alkaline earth metal hydrogen-sulfates, oxides in sub-group B of Groups IV to VI, phosphates of elements in Groups I to III, silicates of elements in Groups I to III, mixed silicates of elements in Groups I to III, said groups being groups of the Periodic Table, an ion exchange resin splitting off water and mixtures thereof.

15. A process as claimed in claim 14, wherein the catalyst is an oxide of a transition metal supported on a carrier material.

16. A process for the manufacture of hydrogen cyanide and acetic acid from oximinoacetone which comprises decomposing oximinoacetone at a temperature in the range of about 20° to 300° C. in the presence of about 0.5% to 10%, calculated on the weight of the oximinoacetone, of a basic catalyst selected from the group consisting of a cyclic tertiary amine and a compound of the formula

wherein X is an atom of an element of Group V of the Periodic Table, $R_1$ is selected from the group consisting of hydrogen and a hydrocarbon radical, and $R_2$ and $R_3$ are hydrocarbon radicals.

17. A process as claimed in claim 1, wherein the reaction is carried out in an inert fluid diluting agent.

References Cited by the Examiner

Degering: "An Outline of Organic Nitrogen Compounds, University Lithoprinters, Ypsilanti, Michigan, 1945, page 188.

Hurd: "The Pyrolysis of Carbon Compounds," American Chemical Society Monograph Series, The Chemical Catalogue Company, Inc., New York, 1929, page 667.

BENJAMIN HENKIN, *Primary Examiner.*

MAURICE A. BRINDISI, *Examiner.*

E. C. THOMAS, *Assistant Examiner.*